US012633688B2

(12) United States Patent
Chauhan et al.

(10) Patent No.: US 12,633,688 B2
(45) Date of Patent: May 19, 2026

(54) CONNECTOR-LESS M.2 MODULE

(71) Applicant: Intel Corporation, Santa Clara, CA (US)

(72) Inventors: Shailendra Singh Chauhan, Bengaluru (IN); Bijendra Singh, Bangalore (IN); Siva Prasad Jangili Ganga, Jam Baugh (IN); Santhosh Ap, Bangalore (IN); Ranjul Balakrishnan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 17/902,503

(22) Filed: Sep. 2, 2022

(65) Prior Publication Data

US 2023/0006375 A1 Jan. 5, 2023

(51) Int. Cl.
*H01R 12/71* (2011.01)
*H01R 12/52* (2011.01)
*H01R 13/24* (2006.01)

(52) U.S. Cl.
CPC ........... *H01R 12/714* (2013.01); *H01R 12/52* (2013.01); *H01R 13/24* (2013.01)

(58) Field of Classification Search
CPC ...... H01R 12/714; H01R 12/52; H01R 13/24; H01R 12/774; H01R 12/73; H05K 1/0203; H05K 3/368; H05K 2201/0311; H05K 2201/042; H05K 2201/10265; H05K 1/144
See application file for complete search history.

(56) References Cited

U.S. PATENT DOCUMENTS 3,003,131 A * 10/1961 Nystuen ............... H01R 12/714 439/55
2017/0279211 A1* 9/2017 Tadepalli ............... H01R 13/24

FOREIGN PATENT DOCUMENTS

CN 111417857 A * 7/2020 ........... G01R 1/0466
KR 101926387 B1 * 12/2018 ......... G01R 31/2863
WO WO-2015007255 A1 * 1/2015 ......... H05K 13/0069

* cited by examiner

*Primary Examiner* — Travis S Chambers
(74) *Attorney, Agent, or Firm* — Compass IP Law PC

(57) ABSTRACT

Embodiments of connector-less modules and associated platforms employing the module. The module employs a Land Grid Array (LGA) comprising an array of LGA pins on the underside of the module PCB that are configured to engage respective pads patterned on a motherboard or system board PCB by applying a downward force to the module PCB. A novel clip assembly is provided to apply the downward force, while also aligning the module PCB (and its LGA) to the motherboard or system board PCB. A heat shield is provided that is configured to be disposed over the module PCB to facilitate enhanced thermal spreading and lowering thermal resistance both towards the heat shield and the PCBs. Example modules include a WWAN module and an NVMe SSD module. The module PCB may employ an M.2 form factor or other form factors.

8 Claims, 12 Drawing Sheets

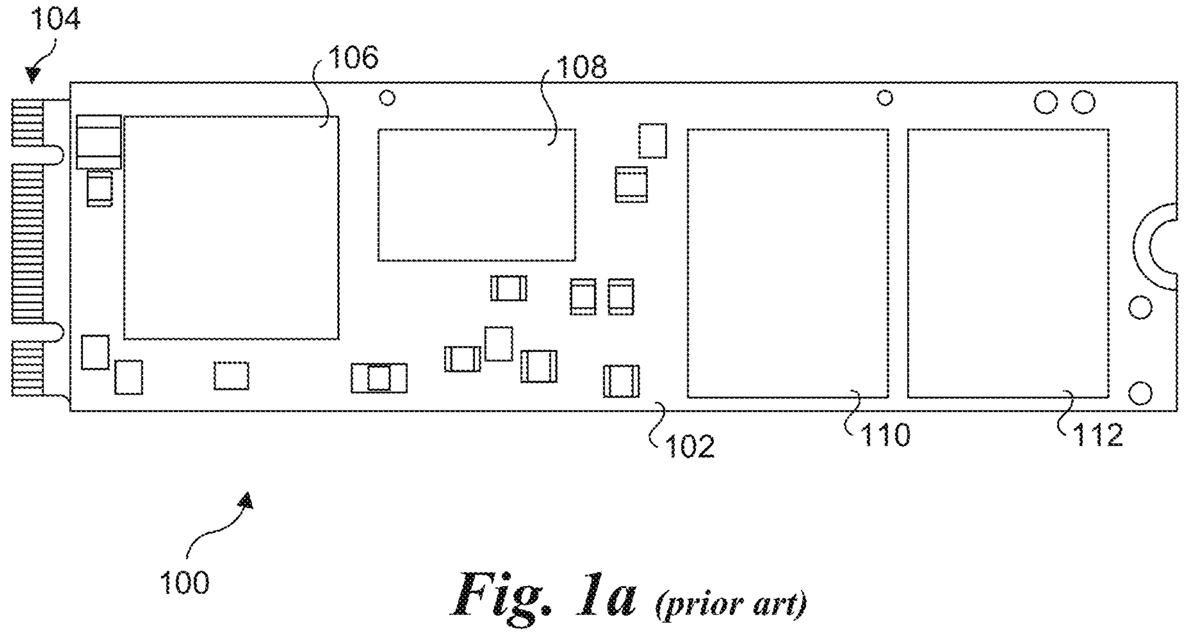
*Fig. 1a* *(prior art)*
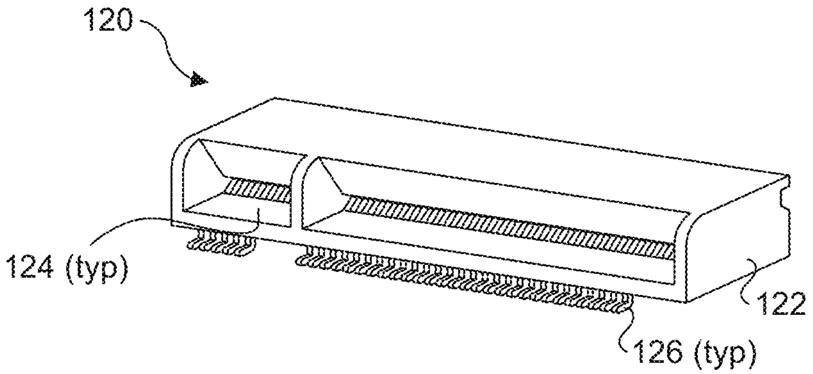
*Fig. 1b* *(prior art)*

910
908
906
904
902
900
913

900
916
914 (typ)
913

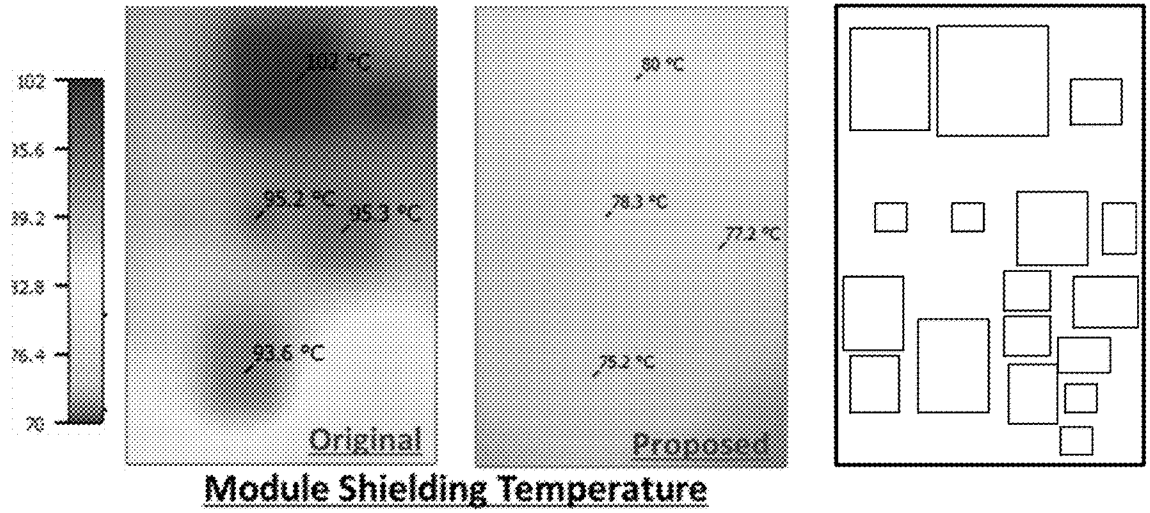
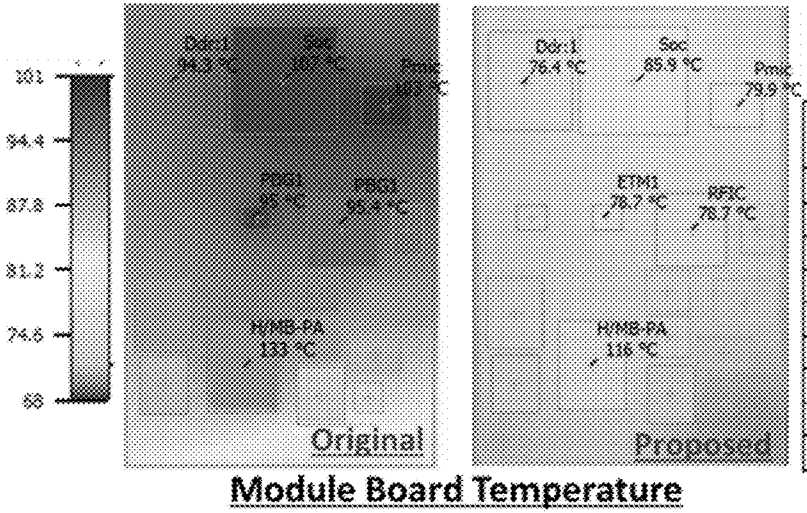
| 5GNR Max UL with Corresponding DL max<br>[MTK: SA DL: 4.67 Gbps SA UL: 1.25 Gbps, ETA: 2020/2E] | |
|---|---|
| Module Power distribution (mW) | |
| LTE MHB PAM | 2184 |
| ETM1 | 750 |
| RF Front end( LNA + Switches) | 94 |
| RFIC | 966 |
| PMIC | 1210 |
| DRAM | 171 |
| SOC | 3609 |
| **Total Module** | **8983** |
*Fig. 10*

CONNECTOR-LESS M.2 MODULE

BACKGROUND INFORMATION

Edge connectors are widely used for add-in cards (AICs) in high-speed differential I/O (input/output) applications. For example, most desktop computers include multiple PCIe (Peripheral Component Interconnect Express) expansion slots with connectors mounted to the motherboard that are configured to interface with edge connectors on PCIe AICs (also referred to as expansions cards). This PCIe connectors are mounted perpendicular to the motherboard PCB (printed circuit board).

In 2012, Intel® Corporation introduced M.2 (pronounced M dot 2) for internal expansion cards on PC motherboards and laptop and the like. M.2, which originally Next Generation Form Factor (NGFF), was conceived as a successor of the mSATA interface. Today, M.2 supports multiple types of interfaces, including Peripheral Interconnect Connect Express (PCIe) 3.0 and 4.0, Serial ATA 3.0, USB 3.0, and Non-volatile Memory Express (NVMe).

PCI-SIG (Special Interest Group), the PCIe standards body, developed and standardized the PCIe M.2 card edge and mating PCIe M.2 connector, which is a right-angle connector that enables the expansion card to be installed parallel to the motherboard. Examples of an SSD M.2 edge card 100 and an M.2 connector 120 are shown in FIGS. 1*a* and 1*b*.

SSD edge card 100 includes a PCB 102 including an PCIe M.2 edge connector 104, Various integrated circuits (aka chips) and other electronic components are mounted to PCB 102, including a memory controller chip 106, a DRAM memory chip 108, and a pair of non-volatile (NV) memory chips 110 and 112. PCIe M.2 edge connector has a Key B+M form factor with pins on a single side (the top side of SSD edge card 100 in this example).

PCIe M.2 connector 120 includes a body 122 having a slot in which edge contacts 124 are disposed. The edge contacts 124 are electrically coupled to contacts 126, which are soldered to pads in the motherboard PCB (or other type of PCB). When installed in PCIe M.2 connector 120, the pins in PCIe M.2 edge connector are electrically coupled to edge contacts 124, and thus to the pads in the PCB.

The PCIe M.2 connector was designed for PCIe 3.0 and PCIe 4.0 (3rd and 4th generation) standards. For high speed I/O, such as PCIe5 (PCIe 5th generation), the M.2 connector shows performance degradation. The connector performance improvement is critical for higher data rate I/O applications. In addition, the pin count of this connector is not scalable with given PCIe edge card form factor, which limit the bandwidth of the card.

The M.2 connector used for WWAN has a current limitation of 500 mA per pin. There are 5 pins allocated for current, which means the present M.2 connector can support only up to 3.3V×5×500 mA=8.25 W(atts). With the advent of 5G and LTE advanced, the power requirement has increased significantly and hence the present M.2 connector cannot be used to support all the advanced feature of these new technologies. With the advancement in technologies (Next Gen SSD and WWAN module sub-6 with mm-wave), the PCIe interface needs to support higher speed and bandwidth. However, the current connectors are not designed to work at PCIe speed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1*a* shows an NVMe SSD card including a PCIe M.2 edge connector.

FIG. 1*b* shows a right-angle PCIe M.2 connector.

FIG. 10 show heat maps demonstrating a reduction in the module shielding temperature and module board temperature for a 9 Watt WWAN module.

DETAILED DESCRIPTION

Figure 2A:
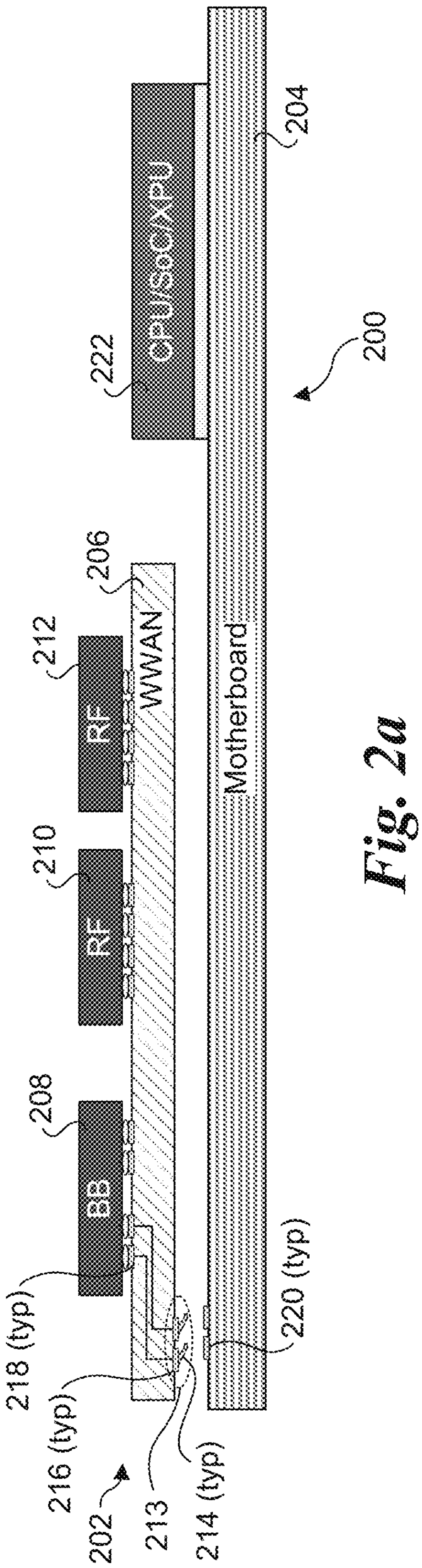
FIGS. 2*a* and 2*b* show cross-section views of a platform before and after a WWAN module has been coupled to a motherboard.

Embodiments of apparatus comprising connector-less modules are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiment described and illustrated herein, a connector-less M.2. module solution and associated platform employing the M.2 module are provided. In one aspect, the M.2. module solution employs a Land Grid Array (LGA) comprising an array of LGA pins on the underside of the module PCB that are configured to engage respective pads patterned on the motherboard or system board PCB by applying a downward force to the module PCB. In another aspect, a novel clip assembly is provided to apply the downward force. According to another aspect, a heat shield is provided that is configured to be disposed over the module PCB to facilitate enhanced thermal spreading and lowering thermal resistance both towards the heat shield and the PCBs.

Figure 2B:
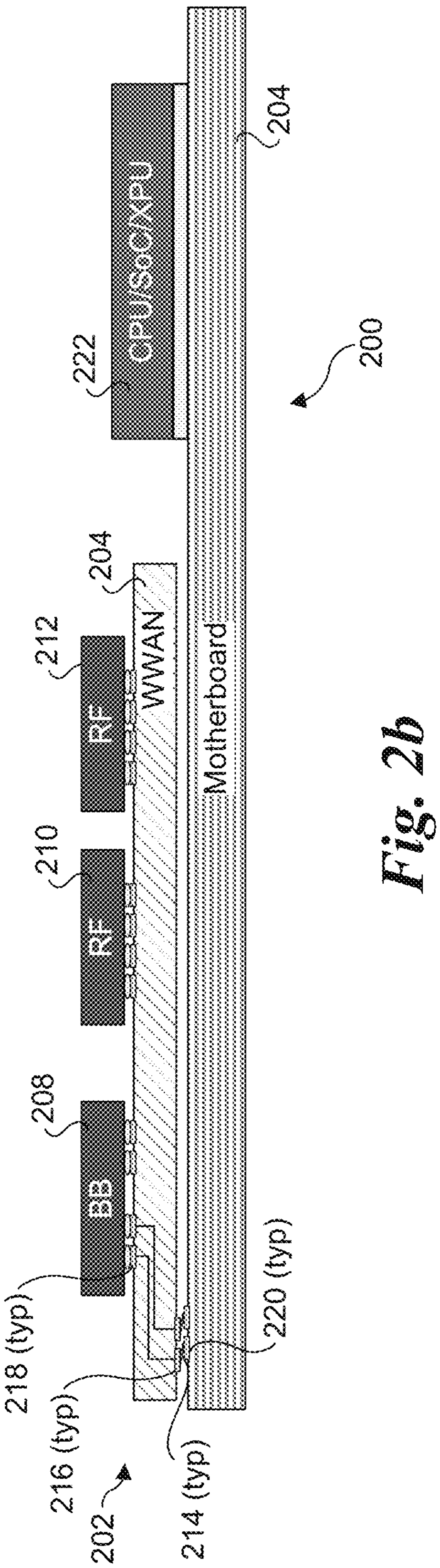

FIGS. 2*a* and 2*b* show cross-section views of a platform 200 before and after a WWAN module 202 has been coupled to a motherboard 204. WWAN module 202 includes a PCB 206 to which various WWAN circuit components are mounted. For simplicity, these includes a baseband (BB) chip 208, and two Radio Frequency (RF) chip 210 and 212; in practice, a WWAN module will have additional chips, as well as other circuitry.

A Land Grid Array (LGA) 213 comprising an array of LGA pins 214 coupled to pads 216 is disposed on the underside of PCB 206. LGA pins 214 are coupled to pads 218 on BB chip 208 via wiring (traces and vias) in PCB 206. In one embodiment, BB chip 208 is a Ball Grid Array (BGA) package and pads 218 are BGA pads; however, the chips illustrated herein, including BB chip 208 may use other types of packages, as well. Some of LGA pins 214 may also be coupled to other WWAN circuitry via wiring that is not separately shown. In addition, a portion of the LGA pins will be used for power signals (input voltage(s) and ground) that may be routed to various WWAN circuitry.

As illustrated in FIG. 2*b*, when WWAN module 202 is mounted to motherboard 204, LGA pins 214 are place in contact with pads 220 disposed on the topside of motherboard 204. The pattern of the LGA pins 214 and pads 220 match, as illustrated in the embodiments below. Wiring (not shown) in motherboard 204 is used to couple pads 220 to circuit components mounted to motherboard 204 including a Central Processing Unit (CPU), System on a Chip (SoC), or Other Processing Unit (XPU) 222. For simplicity, other circuit components mounted on or coupled to motherboard 220 are not shown but will be understood by those skilled in the art to be present, such as memory devices (e.g., DRAM DIMMs or DRAM chips), power-related components, storage devices, communication ports, etc.

Figure 3A:
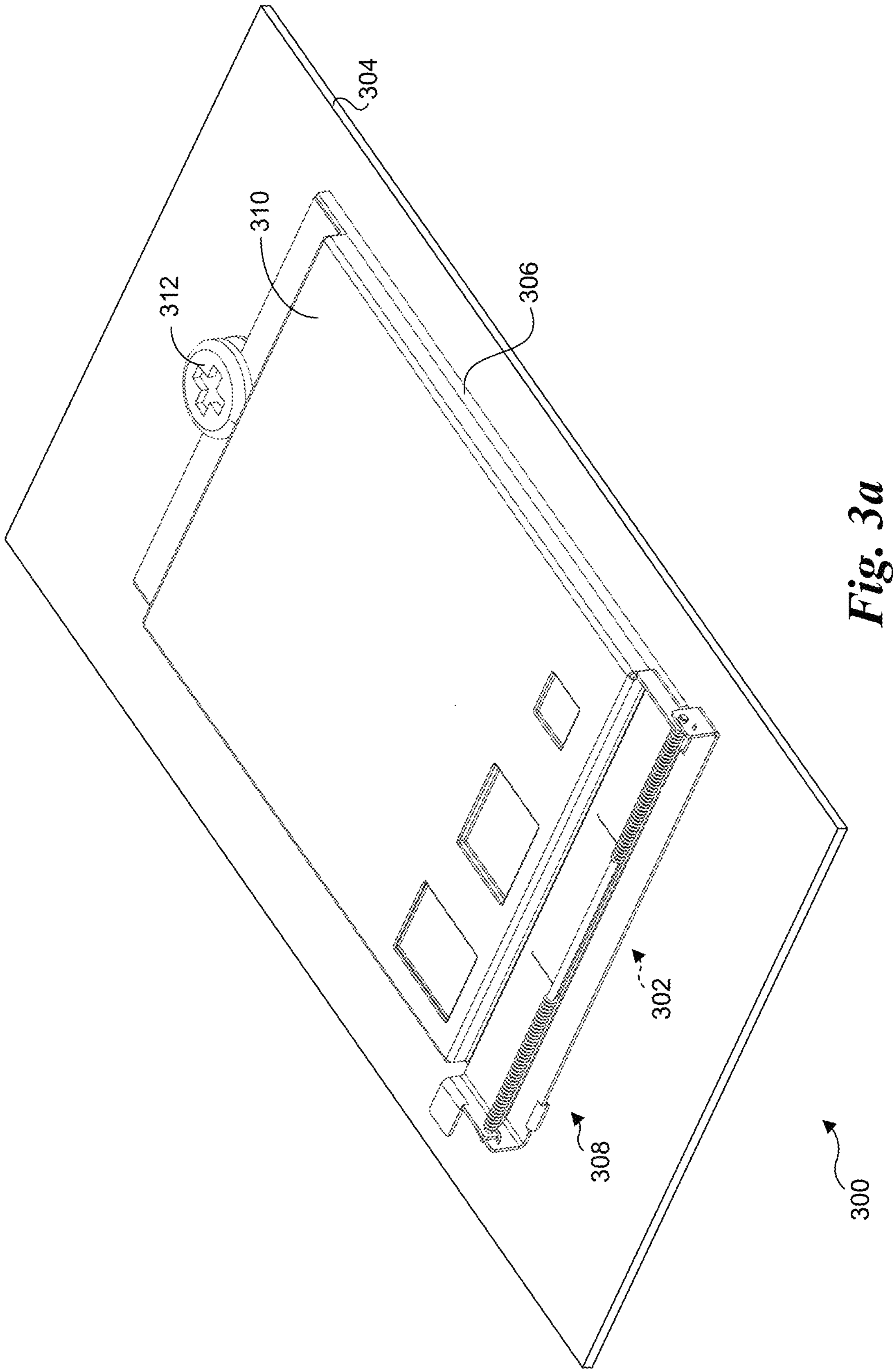
FIG. 3*a* is a 3D isometric topside view of a platform including a WWAN module including an LGA that is coupled to a motherboard using a clip assembly, according to one embodiment.
Figure 3B:
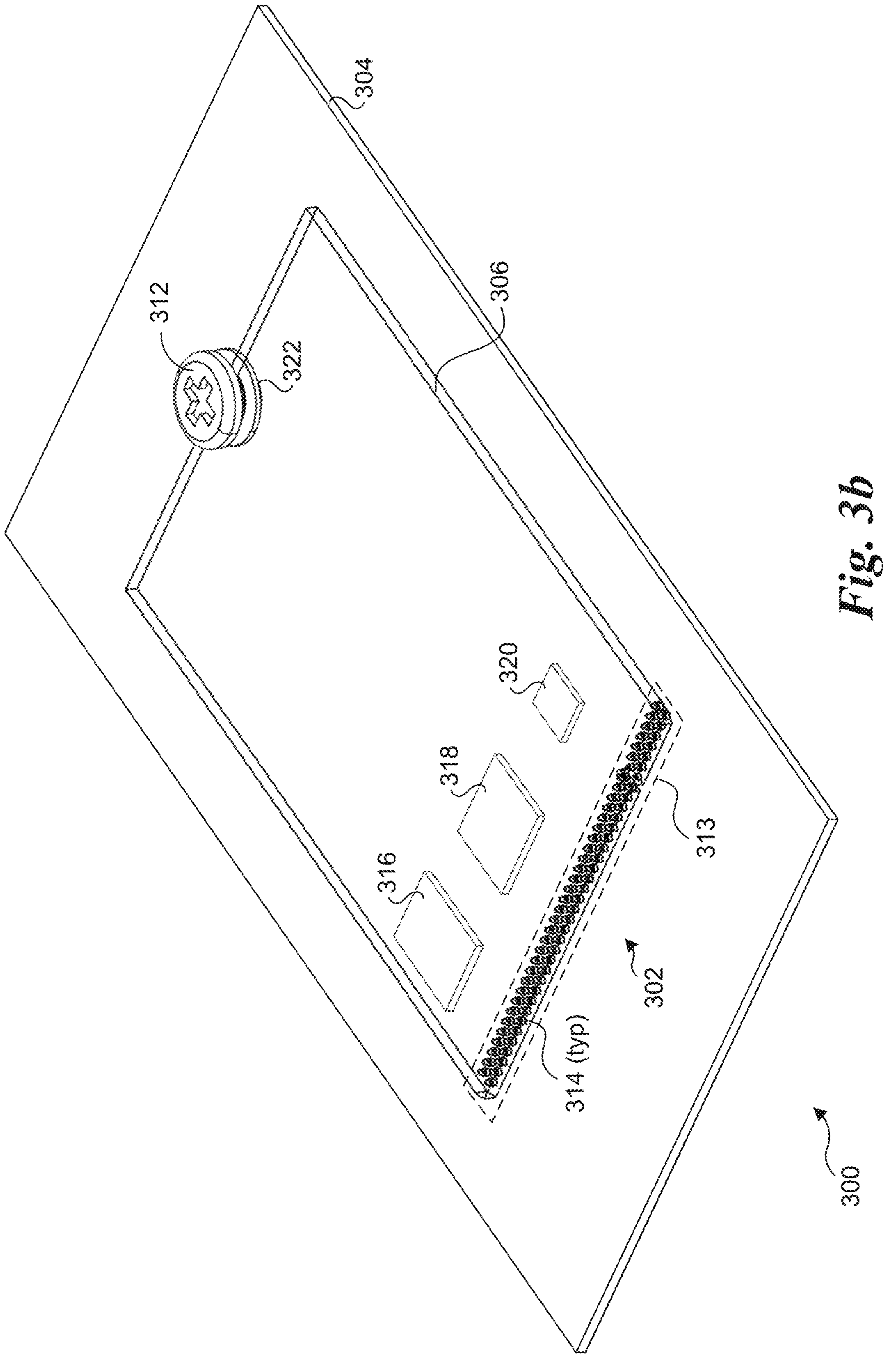
FIG. 3*b* is a 3D isometric underside view of the platform of FIG. 3*a;*

FIGS. 3*a* and 3*b* show three-dimensional (3D) isometric views of a platform 300 including a WWAN module 302 that is mounted to a motherboard 304 using a clip assembly 308. WWAN module 302 includes a PCB 306 having various WWAN components and circuitry that is covered by a heat shield 310 that is held down at its front end by clip assembly 308 and at its back end by a screw 312 that is threaded into a nut 322 (see FIG. 3*b*) that is disposed beneath motherboard 304. Optionally, a threaded insert that is inserted into hole in motherboard 304 may be used in place of nut 322.

As further shown in FIG. 3*b*, an LGA 313 comprising an array of LGA pins 314 is disposed on the underside towards the front edge of motherboard 306. An exemplary set of chips used for a baseband portion of the WWAN circuitry is shown mounted to PCB 306, including a DDR (Double Data Rate) DRAM chip 316, a baseband modem SoC 318, and PMIC (Power Management Integrated Circuit) 320.

Figure 4A:
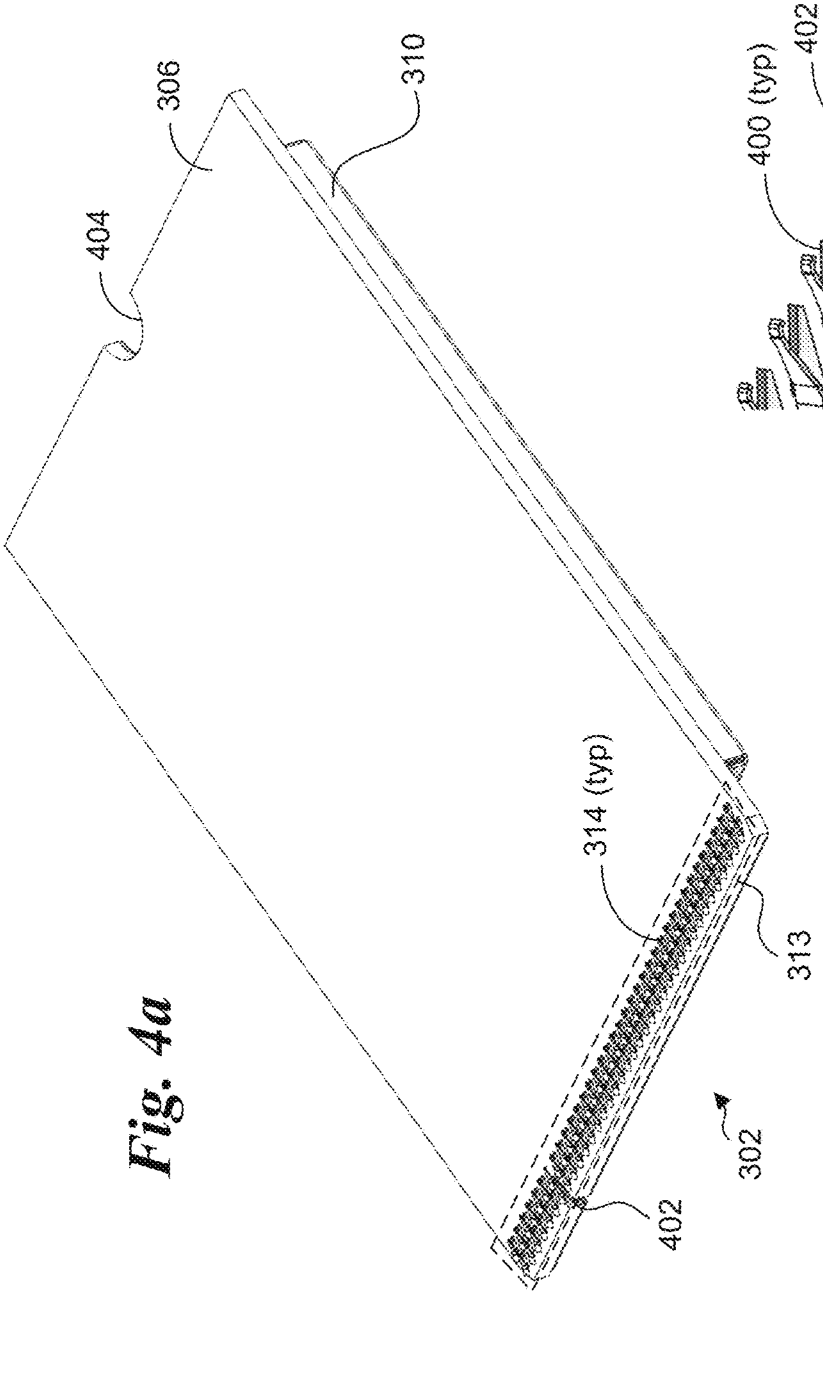
FIG. 4*a* is a 3D isometric underside view of the module PCB with LGA, according to one embodiment.
Figure 4B:
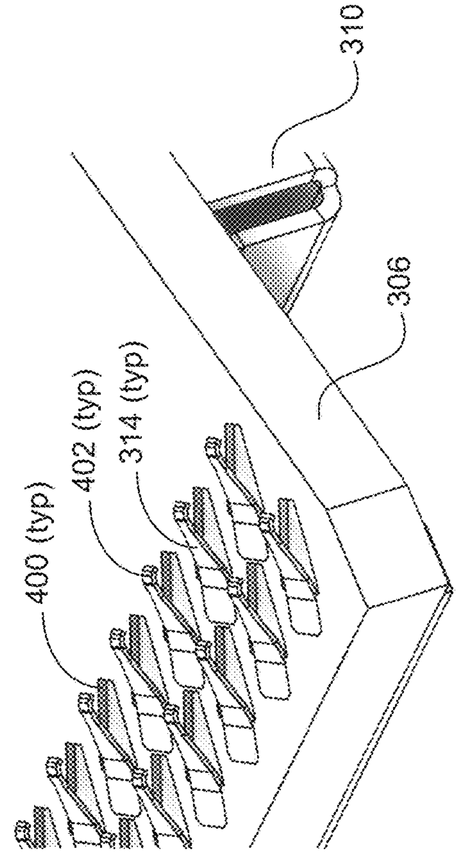
FIG. 4*b* shows an enlarged view of a portion of the module PCB illustrating further details of the LGA pin structure, according to one embodiment.

FIG. 4*a* shows an underside view of WWAN module 302, while FIG. 4*b* shows a blow-up detail of a portion of the underside view. In this embodiment, LGA 313 comprises two columns of 37 LGA pins 314 for a total of 74 LGA pins. As shown in the detail of FIG. 4*b*, in the illustrated embodiment there is a recess 400 for each LGA pin 314 in PCB 306. In the illustrated embodiment, an LGA pin 314 is a cantilevered leaf spring with a "fishbone" shape including a lob 402 that is in contact with mating pad on the motherboard when clip 308 (FIG. 3*a*) is in its clamped position. In one embodiment, the fixed ends of LGA pins 314 are soldered to pads (not separately shown) patterned on PCB 306. However, this is not limiting, as other LGA and LGA pin structures may be used. As further shown in FIG. 4*a*, an alignment slot 402 is formed in the front edge of PCB 306 and a notch 404 having a radius is formed in the back edge of the PCB, where the radius is sized to match the shoulder diameter of screw 312.

Figure 5A:
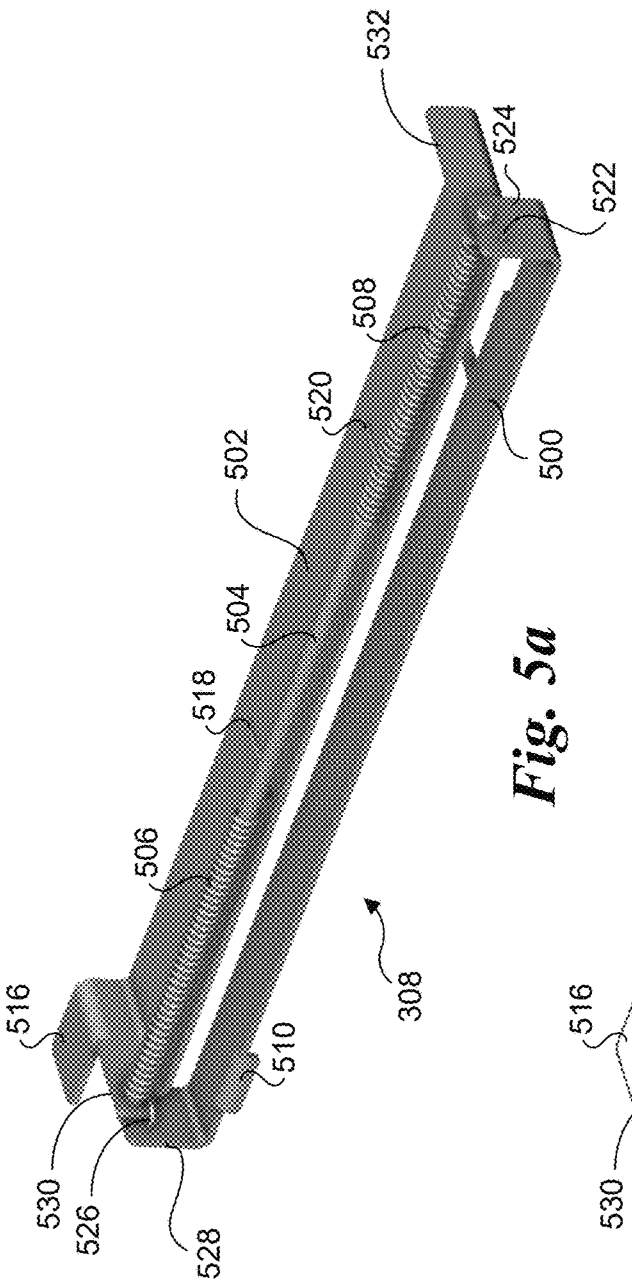
FIG. 5*a* is a 3D shaded image view of the frontside of a clip assembly, according to one embodiment.
Figure 5B:
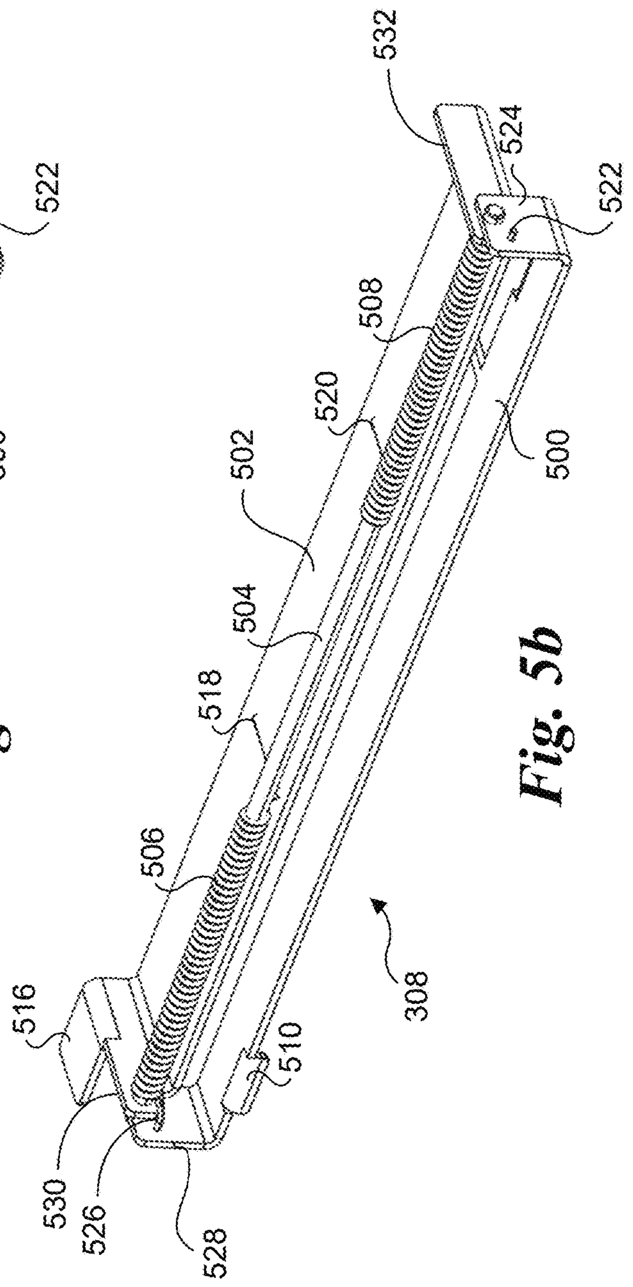
FIG. 5*b* is a hidden line view of the clip assembly of FIG. 5*a;*
Figure 5C:
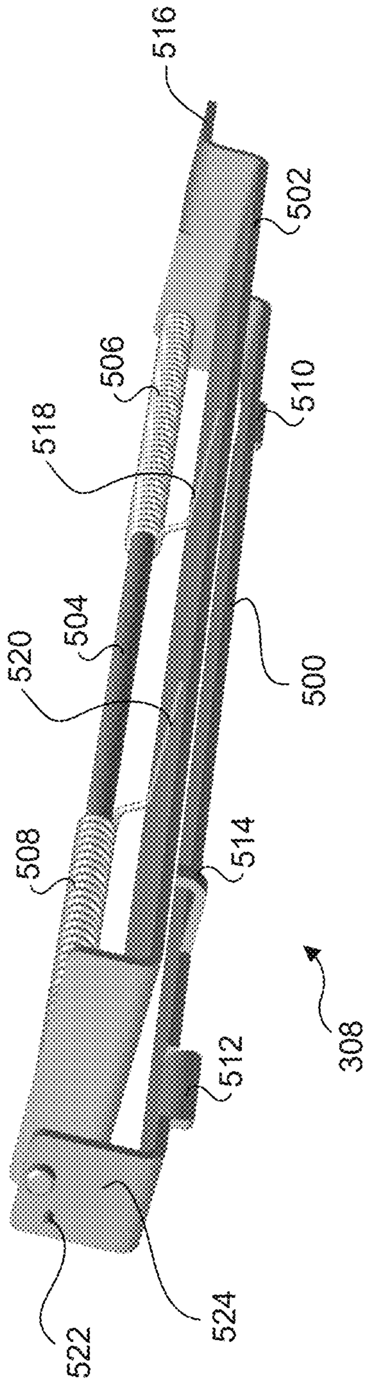
FIG. 5*c* of a 3D shaded image view of the backside of the clip assembly of FIGS. 5*a* and 5*b;*

FIGS. 5*a*, 5*b*, and 5*c* show further details of clip assembly 308, according to one embodiment. The clip assembly includes a hinge bracket 500, a clamp plate 502, a rod 504 and a pair of torsion coil springs 506 and 508. As shown in FIG. 5*c*, hinge bracket 500 includes a pair of tabs 510 and 512, and a PCB slot alignment protrusion 514. Clamp plate 502 includes a finger tab 516. Torsion coil spring 506 includes a cantilevered extension 518, while torsion coil spring 508 includes a cantilevered extension 520. An end 522 of torsion coil spring 508 passes through a hole in an upright 524 of hinge bracket 500. As shown in FIGS. 5*a* and 5*b*, an end 526 of torsion coil spring 506 passes through a hole in an upright 528 of hinge bracket 500. Rod 504 passes through holes in upright 524 and 528 of hinge bracket 500 and uprights 530 and 532 of clamp plate 502.

Figure 6A:
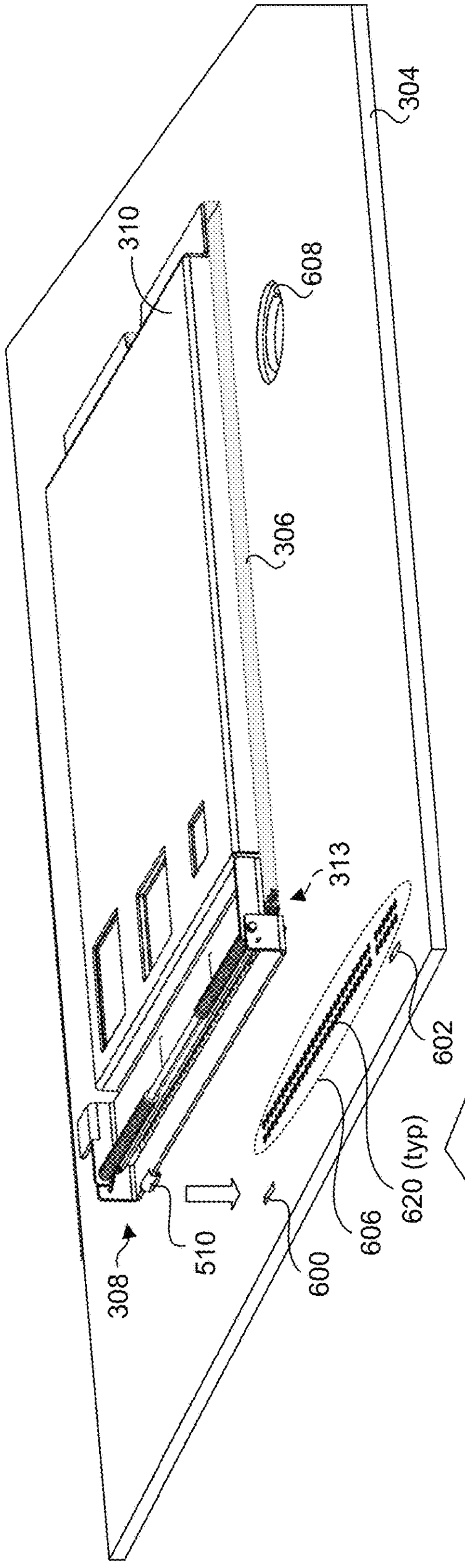
FIGS. 6*a* and 6*b* are 3D hidden line views showing further details of a motherboard and installation of the clip assembly.
Figure 6B:
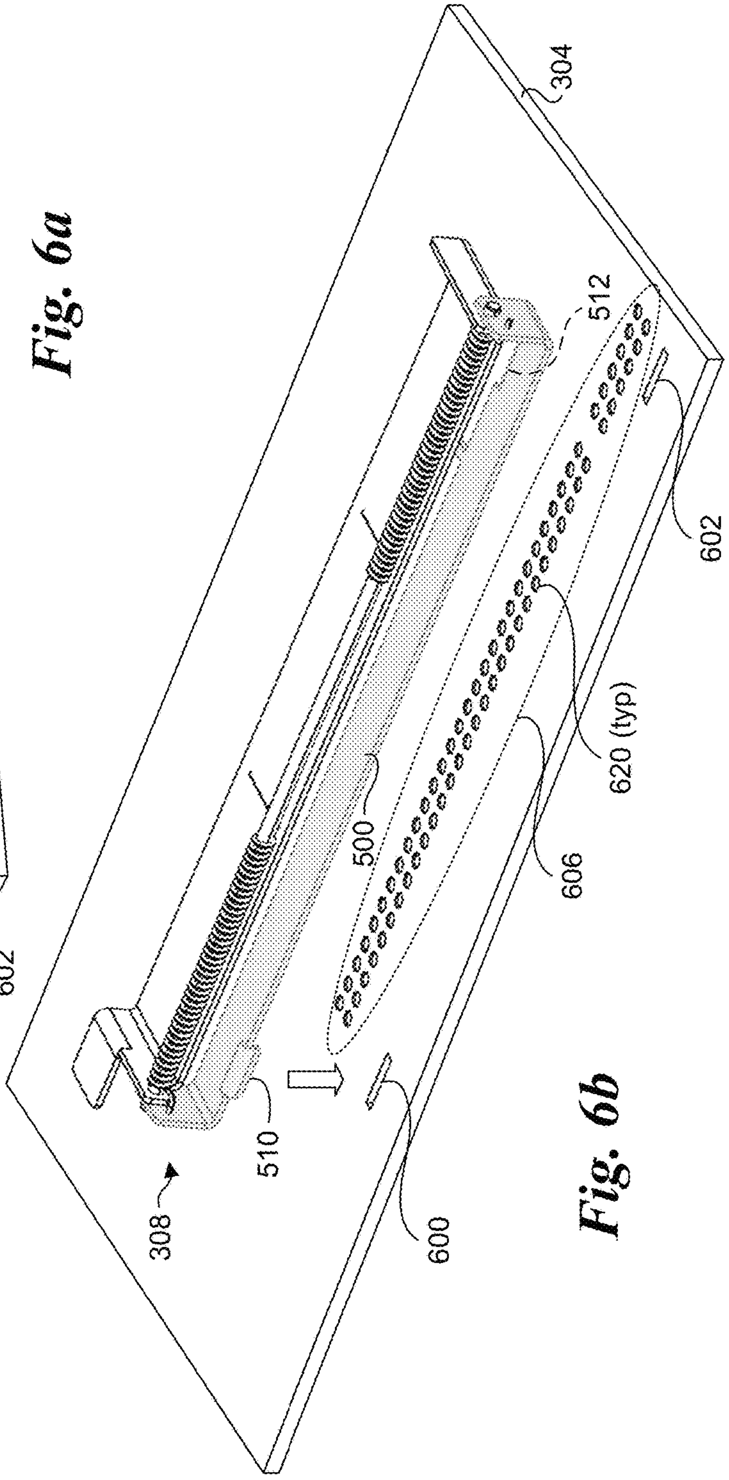

FIGS. 6*a* and 6*b* show further details of motherboard 304 and installation of clip assembly 308. Motherboard 304 includes a pair of slots 600 and 602, and array 606 of surface mount (SM) pads 620, and a hole 608. SM pads 620 are patterned during manufacture of the PCB for motherboard 304. For example, SM pads 620 may be solder mask defined (SMD) pads or non-solder mask defined (NSMD) pads in respective embodiments. Array 600 has a pattern that matches the pattern used in LGA 313.

During installation of clip assembly 308, tabs 510 or 512 of hinge bracket 500 are inserted into slots 600 and 602. In one embodiment, the bottom of hinge bracket 500 is soldered to the topside of motherboard 304. Alternatively, other means may be used to secure hinge bracket 500 to motherboard 304, such as using a suitable adhesive.

Figure 7A:
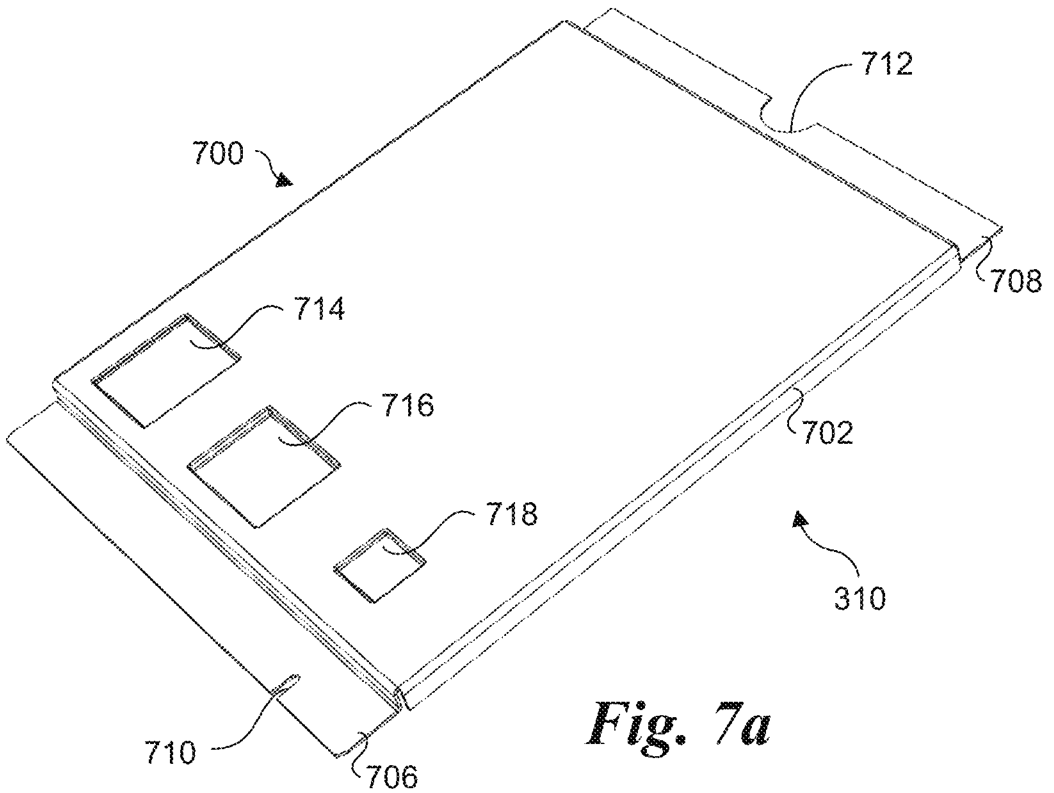
FIGS. 7*a* and 7*b* shows 3D perspective views of the topside of a heat shield and the underside of the heat shield, according to one embodiment.
Figure 7B:
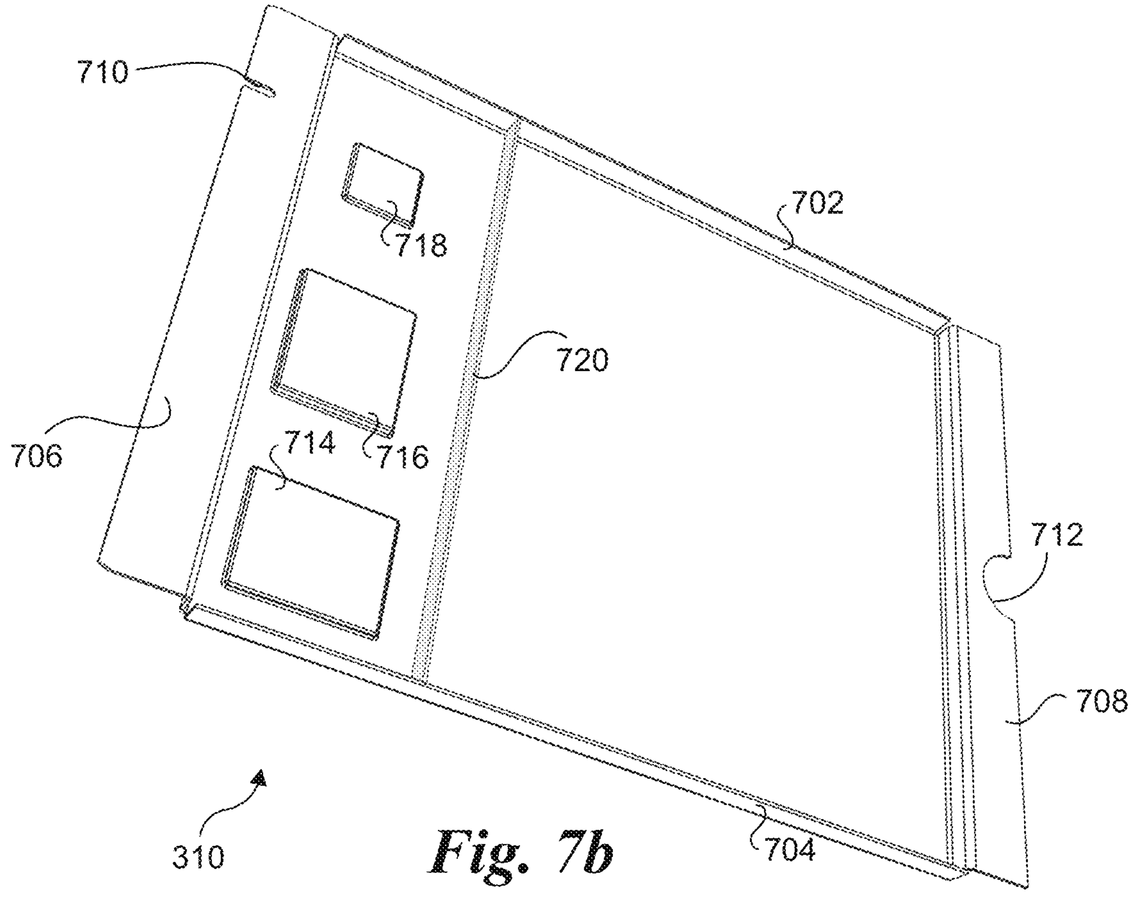

FIGS. 7*a* and 7*b* show topside and underside 3D perspective views of heat shield 310, according to one embodiment. Heat shield 310 comprises a high-conductivity metal sheet (e.g., copper) that is formed by a suitable manufacturing process, such as stamping, to form a cap 700 having sidewalls 702 and 704, a front flange 706, and a rear flange 708. An alignment slot 710 is formed in front flange 706, while a notch 712 having a radius matching the shoulder diameters of screw 312 is formed in rear flange 708.

To enhance heat transfer, debossed features 714, 716, and 718 are formed in cap 700. The shelves of debossed features 714, 716, and 718, which may have variable depths (as applicable) are configured to be disposed above respective chips in the baseband circuitry, with an appropriate thermal interface material (TIM) between the top of the chips and the underside of the debossed features to facilitate heat transfer from high power components such as the baseband modem SoC to the heat shield cap. The shielding height of RF portion is retained to avoid any possible cavity effect which might degrade RF performance. In the illustrated embodiment, a parting barrier 720 is transversely disposed across the width of cap 700. The parting barrier is used to isolate the BB components from the sensitive RF side.

In one embodiment, the heat transfer is further enhanced by strategically placing the GND (ground) vias. TIM is added between the bottom side of the WWAN module and the motherboard or main board on which it is snugly fitted. This helps in increasing the heat dissipation through a larger PCB area; spreading can further be improved by adding a high conductivity spreader on the bottom side of the motherboard/main board.

Figure 8:
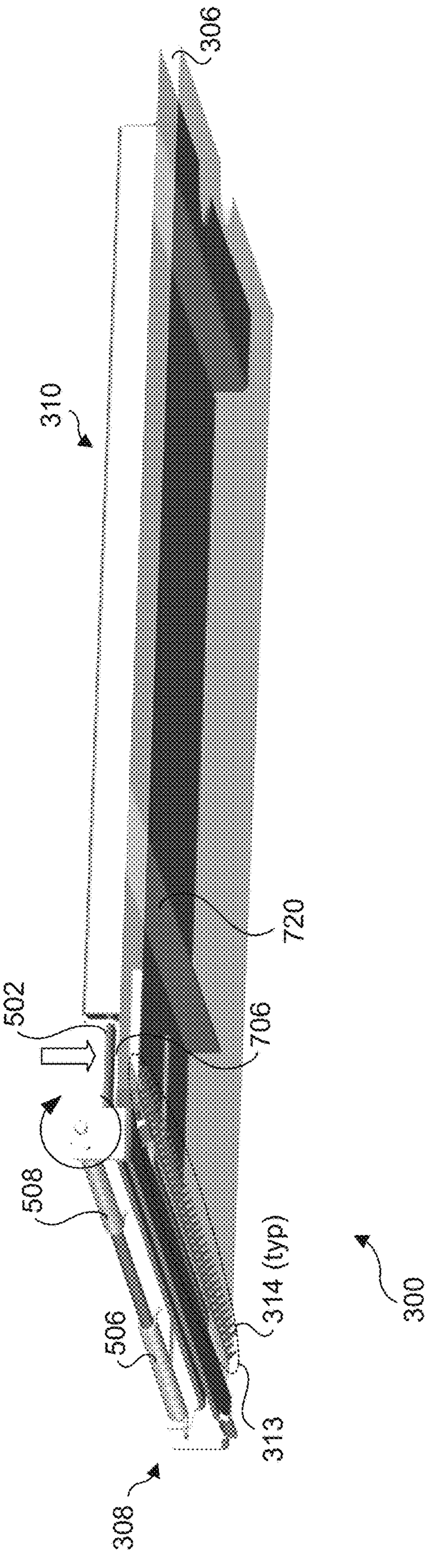
FIG. 8 shows an underside 3D view of a platform with the motherboard removed and the module PCB shown transparently.

FIG. 8 shows an underside 3D view of platform 300 with motherboard 304 removed and PCB 306 shown transparently. Torsion coil springs 506 and 508 apply a rotational force (torque) in a clockwise direction. This results in the underside of clamp plate 502 applying a downward force to the top of flange 706 of heat shield 310. In turn, flange 706, which is disposed above LGA 313, causes LGA pins 314 to engage SM pads 620 (not shown in FIG. 8).

M.2 Form Factor

In accordance with an aspect of some embodiments, the module PCB has an outline form factor in accordance with the M.2 specification. The M.2 PCB form factors define a PCB width of 22 millimeters (mm) and varying lengths of 30, 42, 60, 80, and 110 mm. Each PCB form factor includes a notch having a radius formed in the end of the PCB opposite the connector end that is used to align that end of the PCB with a mounting screw. The M.2 specification defines several edge connector configurations, including connectors with a single row of pins and connectors with two columns of pins. Under some embodiments herein, the module PCBs employ an M2 PCB form factor while employing a connection-less LGA rather than a card edge configured to mate with an edge connector.

In addition to the M.2 form factors, other PCB form factors may also be used. The form factors include the Next Generation Small Form Factor (NGSFF, aka NF1 or M.3) recently introduced by Samsung®.

Figures 9A, 9B:
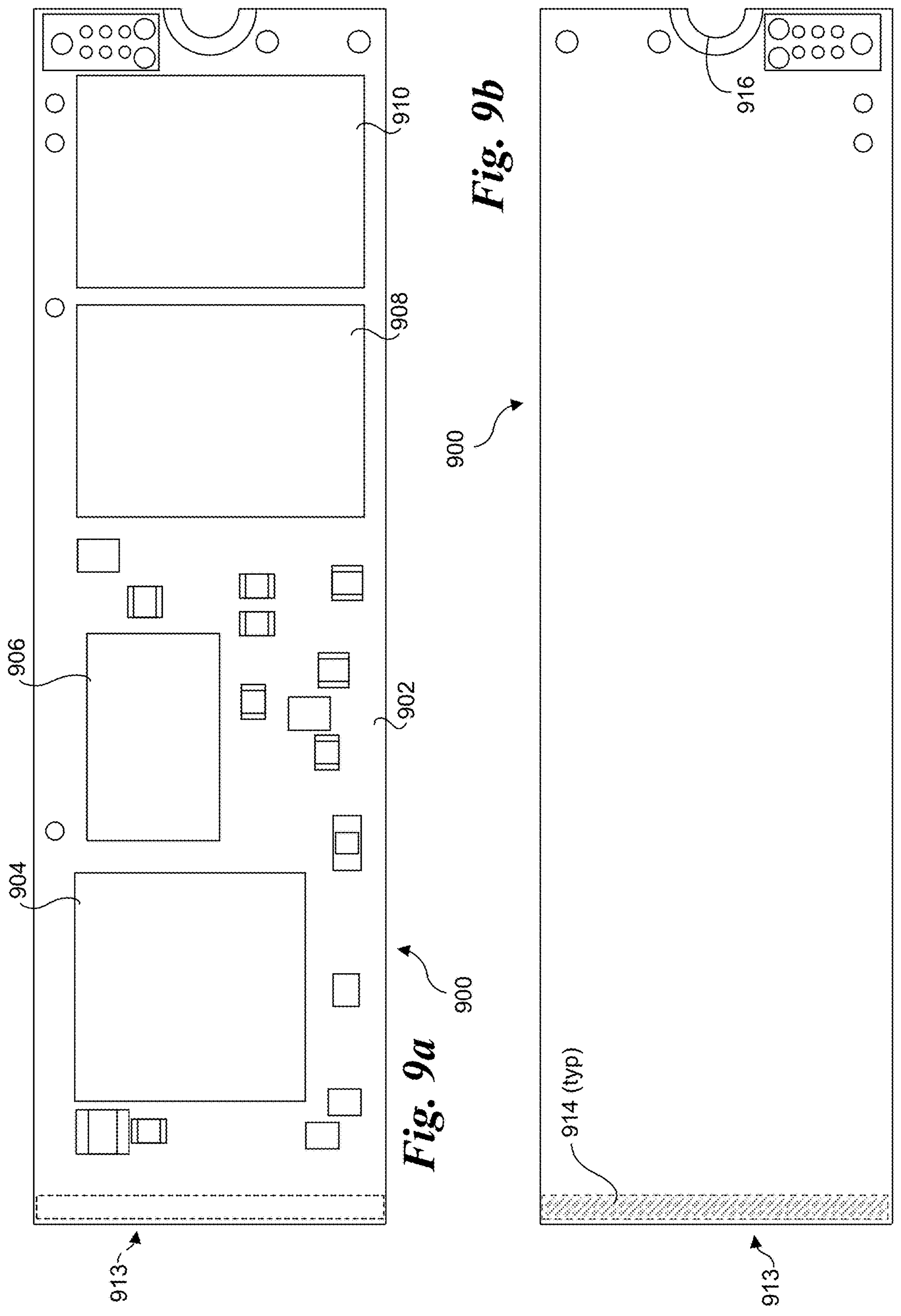
FIGS. 9*a* and 9*b* respectively show topside and underside views of a first NVMe SSD card including a first array of pads that are used to connect to mating pins or contacts in a CMT connector.

FIGS. 9*a* and 9*b* show topside and underside views of an NVMe SSD module 900, according to one embodiment. NVMe SSD 900 includes a PCB 902 to which various chips and other electronic components are mounted, including a memory controller chip 904, a DRAM memory chip 906, and a pair of non-volatile (NV) memory chips 908 and 910. Under one aspect the form factor PCB 902 remains substantially the same as an existing M.2 NVMe SSD, except the PCIe M.2 edge connector is replaced with an LGA 913 of LGA pins 914 formed on the underside of the PCB in the illustrated embodiment. PCB 902 also includes a notch 916 having a radius matching the shoulder diameter of a screw used to secure the right end of PCB 902 to a motherboard or main board.

Signal traces (e.g., wiring) in PCB 902 are used to provide signal paths between LGA pins 914 and memory controller chip 904 and other electronic components on NVMe SSD 900. Upon installation of NVMe SSD 900 (e.g., in a laptop or notebook computer), LGA pins 914 would be electrically coupled to respective pads patterned on the motherboard PCB in a similar manner to that shown for the WWAN module. The use of a heat shield for an NVMe SSD is optional.

Generally, the number of LGA pins, dimensions of the LGA array, size of the SM pads, and pitch are all parameters that may be varied to suit the needs of a given application. In some embodiments, the number of LGA pins and SM pads may be substantially more than the number of pins on conventional PCIe M.2 edge connectors (or other types of edge connectors). The use of more LGA pins and SM pads enables support for a larger number of I/O signals and an increase in I/O bandwidth.

Generally, in addition to CPUs and/or SoCs, the teaching and principles disclosed herein may be applied to Other Processing Units (collectively termed XPUs) including one or more of Graphic Processor Units (GPUs) or General Purpose GPUs (GP-GPUs), Tensor Processing Units (TPUs), Data Processing Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of GPUs, this is merely exemplary and non-limiting. Moreover, as used in the following claims, the term "processor" is used to generically cover CPUs, GPUs, and various forms of other XPUs.

The thermal solutions described and illustrated above provide advantages over conventional M.2 modules by reducing the critical component temperatures owing to improved shield cap design and larger main board used for direct heat sinking and spreading. For example, simulations shown in FIG. 10 for 9 W WWAN module power demonstrate bi-directional distribution and spreading of the heat, helping to cool the critical components by up to 20-25 C. Additionally, the shielding temperature is dropped by >20 C, which will result in lower skin temperature and will directly benefit skin limited designs.

The stack height is also reduced, when compared to conventional M.2 solutions. For example, in one embodiment the stack height above the motherboard is only 2.25 mm, including the heat shield.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A platform, comprising:

a main board, comprising a printed circuit board (PCB) having an array of pads patterned on a topside in a first pattern, and at least one component having signals coupled to multiple pads in the array of pads via wiring formed in the main board PCB;

a module, comprising, a module PCB having circuit components mounted to a topside thereof;

a Land Grid Array (LGA) disposed on an underside of the module PCB, comprising a plurality of LGA pins arranged in a second pattern matching the first pattern; and wiring comprising traces and vias formed in the module PCB coupling a portion of the LGA pins to one or more of the circuit components; and a clip assembly including a clamp plate that is pivotally coupled to a hinge bracket that is coupled to the main board and including at least one coil torsion spring having a first end engaging the hinge bracket and a second end engaging the clamp plate, wherein the clamp plate is positioned above the LGA of the module PCB and the at least one coiled torsion spring applies a downward force to the module PCB to cause the LGA pins to engage pads in the array of pads on the main board PCB.

2. The platform of claim 1, wherein the module PCB has an outline form factor in accordance with the M.2 specification.

3. The platform of claim 1, wherein the module comprises a solid-state drive (SSD) module, and the plurality of circuitry components include a memory controller and at least on non-volatile memory device.

4. The platform of claim 1, wherein the module comprises a Wireless Wide Area Network (WWAN) module including a plurality of baseband components and a plurality of radio frequency (RF) components mounted to a WWAN PCB.

5. The platform of claim 4, further comprising a heat shield that is configured to be mounted over the WWAN PCB.

6. The platform of claim 5, wherein the heat shield has a cap section having one or more debossed features formed therein, and wherein the one or more debossed features are configured to be thermally coupled to respective baseband components mounted to the module PCB via a thermal interface material.

7. The platform of claim 1, wherein an LGA pin comprises a cantilevered member having a lobe that is configured to contact a pad in the array of pads patterned on the mainboard PCB.

8. The platform of claim 7, the module PCB further having a recess proximate to an LGA pin, wherein when the lobe of the LGA pin is in contact with the pad a portion of the cantilevered member is disposed in the recess.

* * * * *